(12) United States Patent
Hohmann et al.

(10) Patent No.: US 6,435,564 B1
(45) Date of Patent: Aug. 20, 2002

(54) HIGH PRESSURE CONDUIT CONNECTOR

(76) Inventors: Frank Hohmann, Beethovenstrasse 9, D-59581 Warstein; Jörg Hohmann, Uhlandstrasse 9a, D-59872 Meschede, both of (DE)

( * ) Notice: Subject to any disclaimer, the term of this patent is extended or adjusted under 35 U.S.C. 154(b) by 0 days.

(21) Appl. No.: 09/624,538

(22) Filed: Jul. 24, 2000

(30) Foreign Application Priority Data

| Jul. 23, 1999 | (DE) | 199 34 063 |
| Jul. 20, 2000 | (DE) | 100 35 691 |

(51) Int. Cl.[7] ............................................... F16L 35/00
(52) U.S. Cl. ................... 285/115; 285/259; 285/318
(58) Field of Search .................... 285/318, 115, 285/116, 259, 256

(56) References Cited

U.S. PATENT DOCUMENTS

| 3,088,756 A | * | 5/1963 | May ........................... 285/116 |
| 3,195,936 A | * | 7/1965 | Conder ..................... 285/334.5 |
| 4,437,689 A | * | 3/1984 | Goebel et al. .............. 285/246 |
| 4,906,031 A | * | 3/1990 | Vyse .......................... 285/318 |
| 5,181,750 A | * | 1/1993 | Reum .......................... 285/38 |
| 5,255,944 A | * | 10/1993 | Blin et al. ................... 285/149 |
| 5,332,269 A | * | 7/1994 | Homm .......................... 285/39 |

FOREIGN PATENT DOCUMENTS

| DE | AS1214490 | 4/1966 |
| DE | OS2104745 | 8/1972 |
| DE | 7508316.8 | 3/1975 |
| DE | 2941020 A1 | 4/1981 |
| DE | 8522245.3 | 10/1985 |
| GB | 0693637 | * 7/1953 ................. 285/115 |

* cited by examiner

Primary Examiner—J. J. Swann
Assistant Examiner—David R. Dunn
(74) Attorney, Agent, or Firm—R W Becker & Associates; R W Becker

(57) ABSTRACT

A high pressure conduit connector is provided. An insertion fitting is partially inserted into a high pressure conduit, and a press-in sleeve is provided that extends over the insertion fitting and the conduit for effecting a pressure-tight connection between them. A safety sheath, preferably embodied as a cylindrical coil spring, is secured to the outer side of the press-in sleeve, and to a portion of the insertion fitting that projects out of the high pressure conduit and the press-in sleeve, at least frictionally.

5 Claims, 1 Drawing Sheet

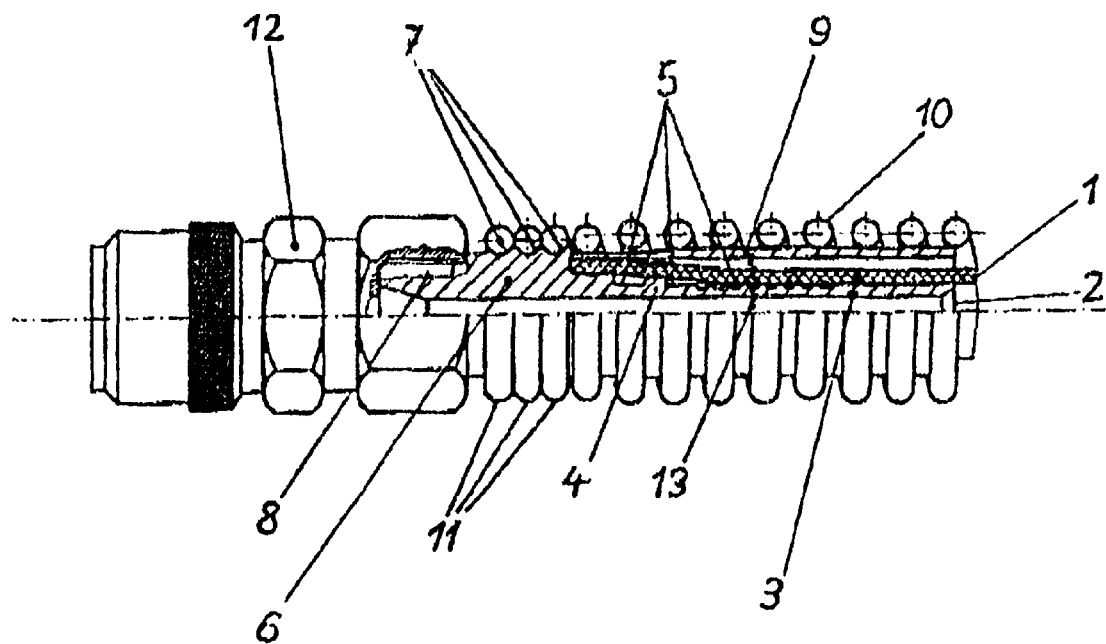

HIGH PRESSURE CONDUIT CONNECTOR

BACKGROUND OF THE INVENTION

The present invention relates to a high pressure conduit connector and includes an insertion nipple or fitting that is pressed into a high pressure conduit, and also including a press-in sleeve that extends over the hose and fitting and effects a pressure-tight connection between them.

The insertion fitting is pressed into the high pressure conduit or hose, with peripheral grooves being provided in that portion of the fitting that is pressed into the conduit. The press-in sleeve is pressed against the high pressure conduit in such a way that portions of the high pressure conduit engage into the grooves of the insertion fitting, resulting in a mechanically satisfactory and pressure-tight connection between the insertion fitting and the high pressure conduit. A threaded nipple is provided on the insertion fitting so that a high pressure coupling can be threaded thereto.

High pressure conduits of this type are produced for very high pressures (at present up to 4000 bar), and serve, for example, for the connection between a high pressure pump and a hydraulic screw cocking or tensioning cylinder with which screws of greater diameters that are subjected to high stresses can be precisely brought to a prescribed pre stress.

During rough operations, such high pressure conduits can be subjected at the press-in location to great bending stresses that over time can cause the insertion fit ting to break. Experience has shown that such a break of the insertion fitting occurs approximately in the middle of the portion that is pressed into the high pressure conduit in the region of a circumferential groove and causes the energy stored in the high pressure conduit due to its elasticity to be released abruptly, to slide off of the insertion fitting, and with the high pressure conduit along with the press-in sleeve being hurled or ejected away with great energy, resulting in a high danger of injury for personnel that are in the vicinity of the high pressure hose, and also to the danger of damage to nearby objects.

It is therefore an object of the present invention to provide a high pressure conduit connector to protect the high pressure conduit from being ejected away from parts that break, and to thereby reduce the risk of injury to personnel or damage to objects.

BRIEF DESCRIPTION OF THE DRAWING

This object, and other objects and advantages of the present invention, will appear more clearly from the following specification in conjunction with the accompanying schematic drawing, which shows a partially cross-sectioned view of one end of one exemplary embodiment of the inventive high pressure conduit connector.

SUMMARY OF THE INVENTION

The high pressure conduit connector includes an insertion fitting that is intended to be partially inserted into a high pressure conduit, with the insertion fitting including a cylindrical portion and a conical portion that conically widens in a direction from the cylindrical portion to a further portion that projects out of the high pressure conduit; grooves are provided on at least a portion of the outer surfaces of the cylindrical and conical portions. The inventive connector also includes a press-in sleeve that extends over the length of the cylindrical and conical portions for effecting a pressure-tight connection between the insertion fitting and a high pressure conduit, wherein the press-in sleeve is adapted to extend over both the insertion fitting and the high pressure conduit; the press-in sleeve is adapted to be pressed against the high pressure conduit only in the region of the conical portion. Finally, the inventive connector includes an elongated safety means that is at least frictionally secured to the projecting portion of the insertion fitting, and is also secured, at least frictionally, to the outer side of the press-in sleeve.

The present invention proceeds from the recognition that that region of such a high pressure conduit connector that is most susceptible to breaking is disposed in the region between the cylindrical and the conical portions of the insertion fitting, and that if the insertion fitting breaks, that end of the high pressure conduit having the press-in sleeve thereon separates from the insertion fitting and the high pressure coupling secured thereto.

In order, as these parts fly apart, to avoid or at least reduce the energy created, it is sufficient to secure the safety means to the insertion fitting and to the press-in sleeve at least frictionally.

The safety means can preferably be secured positively to the insertion fitting and frictionally to the press-in sleeve, whereby the safety means can extend over a longer region of the high pressure conduit. In this way, the press-in sleeve is available over a longer stretch in the safety means, and when the insertion fitting breaks the inherent energy is reduced due to friction in the safety means. In addition, the safety means also serves in a known manner to prevent the high pressure conduit from kinking.

The safety means can also be a preferably reinforced shrinkage hose.

A particularly straightforward, positive connection between the safety means and the insertion fitting can be achieved if the safety means is embodied as a cylindrical coil spring, with the coils or windings at the end of the spring being threadedly fastened to a corresponding threading or grooving on the insertion fitting. In this connection, it is advantageous if the coils of the safety spring that are threaded onto the insertion fitting be wound tighter than the remaining coils in order to keep the threaded portion of the insertion fitting as short as possible. The frictional connection of the safety spring upon the press-in sleeve can be achieved by dimensioning the spring in such a way that it can be tightly shoved onto the press-in sleeve.

Further specific features of the present invention will be described in detail subsequently.

DESCRIPTION OF PREFERRED EMBODIMENTS

Referring now to the drawing in detail, an insertion nipple or fitting 2 having a cylindrical portion 3 and a conically widening portion 4 is pressed or inserted into the end of a high pressure hose line or conduit 1. Both of the portions 3 and 4 of the fitting 2 are provided with grooves 5, for example in the form of a thread, on the outer surface, whereby the grooves become wider and deeper proceeding from the cylindrical portion 3 to the conical portion 4.

A portion 6 of the insertion fitting 2 projects out of the high pressure conduit 1. On its outer side this projecting portion 6 is provided with a threaded nipple 8 that adjoins the projecting region 6; a high pressure coupling 12 is threadedly fastened to the threaded nipple 8.

To provide a pressure tight and positive connection of the high pressure conduit 1 with the insertion fitting 2, a press-in sleeve 9 is shoved over the cylindrical portion 3 and the conical portion 4 of the insertion fitting 2, and in the conical portion 4 is hydraulically compressed in such a way that that end of the high pressure conduit 1 that is shoved onto the conical portion 4 penetrates and is held in the wide and deeper portions of the grooves 5 in the conical portion 4.

The tightly wound coils or windings 11 of a safety spring 10 are threaded onto the grooving 7 of the insertion fitting 2, resulting in a positive connection between the insertion fitting 2 and the safety spring 10. The inner diameter of the safety spring 10 is such that it rests tightly against the outer surface of the press-in sleeve 9, and is thus frictionally connected with the press-in sleeve.

If the insertion fitting 2 breaks in the region designated by the reference numeral 13, and when the region in which the break occurs is disposed approximately in the transition region between the cylindrical portion 3 and the conical portion 4 of the insertion fitting 2, that end of the high pressure conduit 1 having the cylindrical portion 3 remaining therein and also having the press-in sleeve 9, slides off from the conical portion 4 of the insertion fitting 2, is however prevented from being abruptly ejected or hurled away due to the frictional connection between the press-in sleeve 9 and the safety spring 10. In this connection, the safety spring 10 can also elastically expand, so that even with a limited length of the safety spring 10, there is available an adequate slide path of the press-in sleeve 9 in the safety spring 10, with the slide path being restrained or retarded by the frictional connection.

If the safety means or sheath is embodied as a contraction sleeve, fastening to the grooving 7 of the insertion fitting 2 and on the press-in sleeve 9 can be achieved by heating the contraction sleeve, which as a result of such heating contracts, engages in the grooving 7, and comes to rest tightly against the press-in sleeve 9.

The specification incorporates by reference the disclosure of German priority document 199 34 063.3 filed Jul. 23, 1999 and German priority document filed Jul. 20, 2000 which does not yet have a number assigned. This number will be provided as soon as it is assigned by the German Patent Office.

The present invention is, of course, in no way restricted to the specific disclosure of the specification and drawings, but also encompasses any modifications within the scope of the appended claims.

What we claim is:

1. A high pressure conduit connector, comprising:

an insertion fitting for partial insertion into a high pressure conduit, wherein said insertion fitting includes a cylindrical portion, a portion adapted to project out of said high pressure conduit, and there between a conical portion that conically widens in a direction from said cylindrical portion to said projecting portion, and wherein grooves are provided on at least a portion of outer surfaces of said cylindrical and conical portions;

a press-in sleeve that extends over the length of said cylindrical and conical portions for effecting a pressure-tight connection between said insertion fitting and said high pressure conduit, wherein said press-in sleeve is adapted to extend over both said insertion fitting and said high pressure conduit, and wherein said press-in sleeve is adapted to be pressed by crimping against said high pressure conduit only in a region of said conical portion; and an elongated safety means extending at least over the entire length of the press-in sleeve and secured at least frictionally to said projecting portion of said insertion fitting, and also secured, at least frictionally, to an outer side of said press-in sleeve.

2. A high pressure conduit connector according to claim 1, wherein said safety means is positively secured to said insertion fitting and frictionally secured to said press-in sleeve.

3. A high pressure conduit connector according to claim 2, wherein said safety means is embodied as a cylindrical coil spring, and wherein coils at one end of said coil spring are threadedly secured to corresponding threading provided on said insertion fitting.

4. A high pressure conduit connector according to claim 3, wherein said coils of said safety spring that are threadedly secured to said insertion fitting are wound tighter than remaining coils of said spring.

5. A high pressure conduit connector according to claim 3, wherein said safety spring is tightly shoved onto said press-in sleeve.

\* \* \* \* \*